(12) United States Patent
Rineh et al.

(10) Patent No.: US 8,400,085 B2
(45) Date of Patent: Mar. 19, 2013

(54) DYNAMIC BRAKING FOR CURRENT SOURCE CONVERTER BASED DRIVE

(75) Inventors: Ghodratollah Esmaeili Rineh, Waterloo (CA); Sang Woo Nam, On (KR); Manish Pande, Cambridge (CA); Zhongyuan Cheng, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 378 days.

(21) Appl. No.: 12/711,625

(22) Filed: Feb. 24, 2010

(65) Prior Publication Data

US 2011/0057588 A1   Mar. 10, 2011

Related U.S. Application Data

(60) Provisional application No. 61/239,937, filed on Sep. 4, 2009.

(51) Int. Cl.
*H02P 3/22* (2006.01)

(52) U.S. Cl. .................. 318/380; 318/375; 318/376

(58) Field of Classification Search .................. 318/380, 318/375–376
See application file for complete search history.

(56) References Cited

U.S. PATENT DOCUMENTS

| | | | | |
|---|---|---|---|---|
| 4,039,914 A | * | 8/1977 | Steigerwald et al. | ......... 318/375 |
| 4,215,304 A | | 7/1980 | D'Atre et al. | |
| 4,230,979 A | | 10/1980 | Espelage et al. | |
| 4,761,600 A | * | 8/1988 | D'Atre et al. | ................. 318/759 |
| 6,288,508 B1 | * | 9/2001 | Taketomi et al. | ............. 318/376 |
| 6,653,806 B1 | * | 11/2003 | Ono | .............................. 318/375 |

* cited by examiner

*Primary Examiner* — Walter Benson
*Assistant Examiner* — David Luo
(74) *Attorney, Agent, or Firm* — Fay Sharpe LLP; Alex Kuszewski; John M. Miller

(57) ABSTRACT

Current source converter (CSC) based motor drives and control techniques are presented in which DC link current is regulated to a level set by the output inverter during dynamic braking operation by pulse width modulation of a braking resistance connection signal to maintain control of motor torque and speed while mitigating or preventing line side regenerative currents.

25 Claims, 6 Drawing Sheets

DYNAMIC BRAKING FOR CURRENT SOURCE CONVERTER BASED DRIVE

REFERENCE TO RELATED APPLICATION

This application claims priority to and the benefit of U.S. Provisional Patent Application Ser. No. 61/239,937, filed Sep. 4, 2009, entitled "DYNAMIC BRAKING FOR CURRENT SOURCE CONVERTER BASED DRIVE", the entirety of which is hereby incorporated by reference.

FIELD OF THE INVENTION

The present invention relates generally to electrical power conversion and more particularly to dynamic braking for current source converter-based drive systems.

BACKGROUND OF THE INVENTION

Motor drives are electric power conversion systems that convert input power from a line-side source to a different form to provide controlled drive currents to the windings of an electric motor. Current source converter (CSC) type drives typically include a switching rectifier with AC input power being selectively switched to create a DC link current that is fed to an output inverter which creates single or multi-phase AC output current for driving a motor load at a controlled speed and torque. In some motor control situations, it is desirable to modify the drive currents to assist in slowing or stopping (or even reversing) the motor rotation and regenerate power back to the source, a technique generally known as regenerative braking. For CSC drives, inherent regenerative braking capability causes regenerative current flow in the line side or input source, which may be undesirable or unacceptable in certain situations, such as generator sources and the like. Accordingly, there is a need for improved braking techniques such as dynamic braking for CSC type motor drives. In the present disclosure, dynamic braking refers to a technique to dissipate the bulk or all of the regenerative energy into a resistor in the form of heat.

SUMMARY

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure presents current source converter (CSC) motor drives and operating techniques in which DC link current is regulated to a level set by the output inverter during dynamic braking operation by pulse width modulation of a braking resistance connection signal to maintain control of motor torque and speed while mitigating or preventing line side regenerative currents.

In accordance with an aspect of the disclosure, a CSC motor drive is provided, which includes an active rectifier, an intermediate circuit with a DC link choke, an inverter driving a motor load, and a dynamic braking circuit coupled with the rectifier output and the intermediate circuit. A switching control system provides switching control signals in a first mode for normal motor drive operation and in a second mode for dynamic braking operation. In normal operation, the rectifier controls the amount of current provided to the DC link in accordance with a desired value set by the inverter needs. In the second mode, the dynamic braking circuit is engaged by selectively controlling the switched coupling of one or more braking resistors into the DC link circuit, for instance, using pulse width modulation, to regulate the DC link current according to the requirements of the inverter while the rectifier is deactivated to decouple the intermediate circuit from the input source. By this architecture, a desired amount of braking torque can be maintained by the inverter while dissipating braking power in the braking resistor, in a manner that mitigates impact/stress on generators or other line-side sources and on the dc link choke while preventing or mitigating power flow back to the line during dynamic braking. The dynamic braking circuit includes one or more resistances and one or more switching devices operable to selectively connect the resistance into a circuit formed with the intermediate DC circuit in a controlled fashion during dynamic braking.

In certain embodiments, the braking resistance is coupled in a shunt circuit branch across the intermediate circuit input and the shunt branch is selectively shorted by a pulse width modulated switching device to control the DC link current while the regulator is disabled. In other embodiments, a parallel combination of a switching device and braking resistor is coupled in one or both circuit paths between the rectifier output and the intermediate circuit, and the switches are pulse width modulated during dynamic braking to regulate the DC link current according to the amount of current required by the inverter. Some embodiments include a feedback circuit providing at least one feedback signal or value based on a sensed condition of the rectifier, the DC circuit, and/or the inverter, and a mode control component sets the switch control system to either the first or second mode according to the feedback, for example, to initiate dynamic braking when the motor speed and the desired motor torque are of opposite polarities. In certain embodiments, moreover, the rectifier continues to operate in the second mode to regulate the DC current according to the inverter requirements and the dynamic braking control bypasses the dynamic braking resistance(s) in the first mode and connects the dynamic braking resistance(s) into the DC circuit in the second mode.

In accordance with further aspects of the disclosure, a method is provided for operating a current source converter motor drive. The method involves two operational modes of the drive, with the first mode including providing rectifier switching control signals to an active rectifier to convert AC electrical input power to provide a DC current to an intermediate DC circuit having a DC link inductor, as well as regulating the DC current provided to the intermediate DC circuit according to a desired DC current value required by an inverter, and providing inverter switching control signals to the inverter to convert DC current from the intermediate DC circuit to provide AC electrical power to the AC output according to one or more setpoints. In the second operational mode, the method includes providing rectifier switching control signals to disconnect the AC input from the DC circuit to prevent regenerative current from flowing to the AC input, connecting the intermediate DC circuit and the inverter into a series circuit, providing the inverter switching control signals to the inverter to convert DC current from the intermediate DC circuit to provide AC electrical power to the AC output according to the at least one setpoint, and regulating the DC current provided to the inverter according to a desired DC current value representing the requirements of the inverter.

In certain embodiments, the DC current regulation in the second mode includes providing a pulse width modulated dynamic braking switching control signal to a switching device of the series circuit to selectively coupled at least one resistance into the series circuit to regulate the DC current provided to the inverter according to the desired DC current value. Some embodiments, moreover, include sensing a condition of at least one of the rectifier, the intermediate DC circuit, and the inverter, and setting the motor drive mode according the sensed condition, for example, by setting the operational mode of the motor drive to the second mode when a detected or sensed motor speed and a desired motor torque are of opposite polarities.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
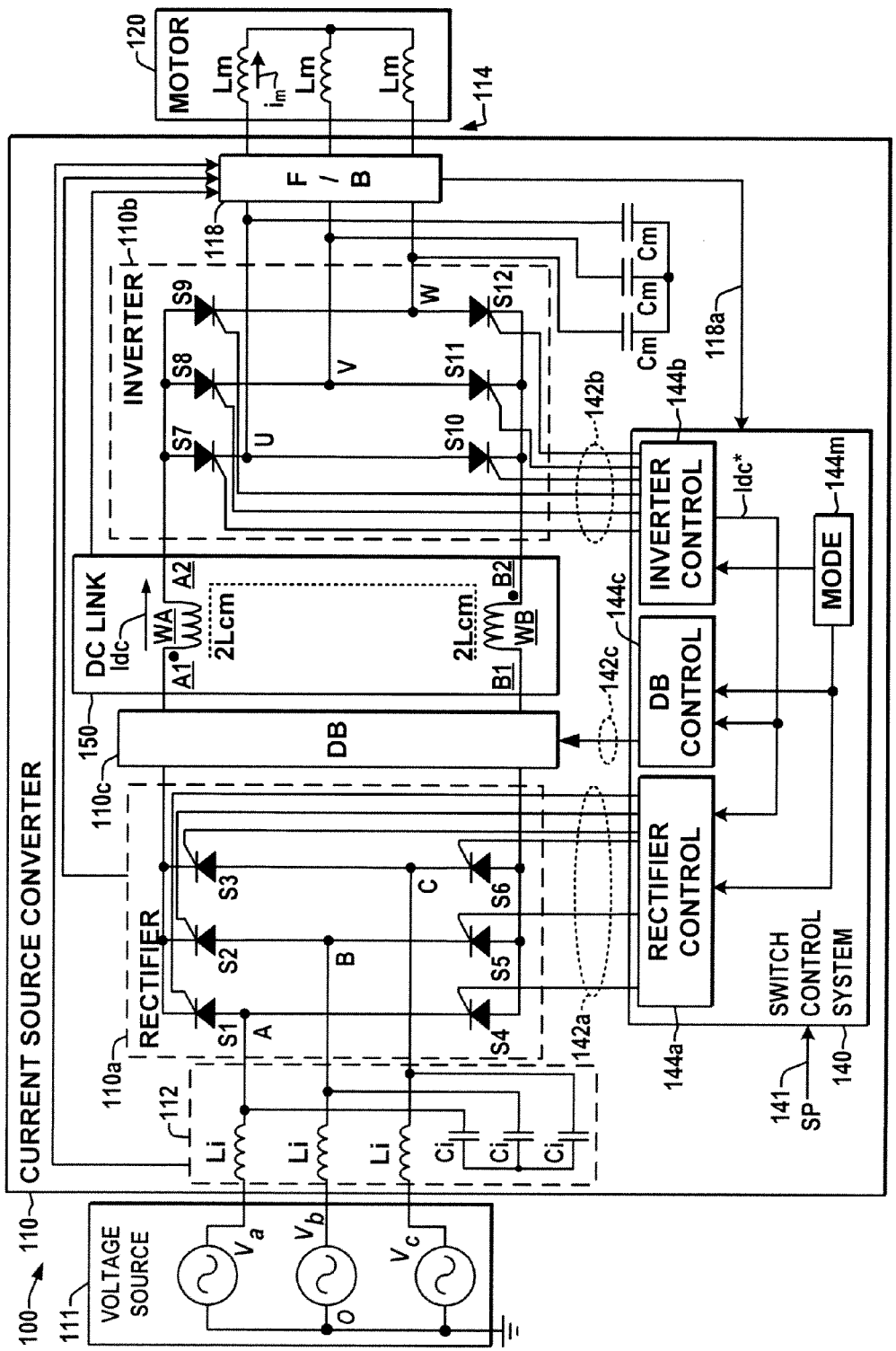
FIG. 1 is a schematic diagram illustrating an exemplary current source converter (CSC)-based power motor drive with a dynamic braking circuit and switching control system in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. A system 100 is shown in FIG. 1, including an exemplary three-phase AC voltage source 111 providing input power to a motor drive 110 that converts the input power to drive a motor load 120 coupled to a converter output 114. The drive 110 is a current source converter (CSC) type, with an input 112 connected to the AC power source 111. While illustrated as having a three phase input 112, other embodiments may provide a single phase AC input or may include a multiphase input adapted to receive three or more input phases. The CSC drive 110 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases. The motor drive 110 includes a dynamic braking circuit 110c and an intermediate DC circuit 150 with a DC link choke having upper and lower windings WA and WB coupled between an input rectifier 110a and an output inverter 110b. In certain embodiments, the DC link could be a simple DC link inductor or a common mode choke as in the illustrated example. The illustrated drive 110, moreover, provides input filtering including inductors Li in each input phase and input filter capacitors Ci coupled between the input lines A, B, C, and an input neutral node. The rectifier 110a is a current source rectifier (CSR) coupled with a current source inverter (CSI) 110b by the intermediate DC circuit 150, and one or more isolation components (e.g., transformers, not shown) may optionally be included in the drive 110. The output 114 provides output electrical power to the motor load 120 via lines U, V, and W, and includes output capacitors Cm coupled between the load 120 and an output neutral node.

The active rectifier 110a includes switching devices S1-S6 coupled between the input 112 and the DC circuit 150 and operates according to a plurality of rectifier switching control signals 142a provided by a rectifier control component 144a of a switch control system 140. In a normal operating mode, the AC input power is switched by the rectifier switches S1-S6 to create an intermediate DC bus current Idc in the intermediate circuit 150. The inverter 110b includes switching devices S7-S12 coupled with the DC circuit 150 and the output 114 and which operate according to corresponding switching control signals 142b from an inverter control component 144b of the switch control system 140 to selectively convert DC power from the DC circuit 150 to provide the AC output power to drive the motor load 120. The DC link choke or inductor links the switches of the CSR 110a and the CSI 110b, and provides forward current paths therebetween. The first winding WA in a forward or positive DC path of the link choke has a first end A1 connected to the upper CSR switches S1-S3 and a second end A2 coupled with the upper CSI switches S7-S9, and the second winding WB in a negative or return DC path has a first end B1 coupled to the lower CSR switches S4-S6 and a second end B2 coupled to the lower CSI switches S10-S12. The switching devices S1-S6 and S7-S12 may be any suitable controllable electrical switch types (e.g., IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could used for the inverter switching devices S7-S12 in the form of forced commutated devices with extra circuitry added to the device triggering circuit thereof.

The motor drive 110 also includes a dynamic braking circuit 110c operatively coupled between the DC output nodes of the rectifier 110a and the first and second DC current paths of the DC circuit 150. The dynamic braking circuit 110c comprising one or more dynamic braking resistances RDB and one or more dynamic braking switching devices DBS that are operated according to a corresponding dynamic braking switching control signal 142c from a component 144c of the controller 140 so as to selectively connect the resistance RDB into a circuit formed with the DC circuit 150. Several different exemplary embodiments of the dynamic braking circuit 110c are illustrated and described below in connection with FIGS. 2-5. The dynamic braking switching devices DBS of the circuit 110c may be any suitable controllable electrical switch types (e.g., IGCTs, GTOs, thyristors, IGBTs, etc.) that are controlled according to any suitable type or form of switching scheme or schemes, such as phase control, pulse width modulation, etc., by the control component 144c. In certain embodiments, DBS1 is a forced commutated device and DBS2 can be forced commutated and/or a Thyristor.

The rectifier 110a, dynamic braking circuit 110c, and the inverter 110b operate under control of a switch control system 140 comprised of one or more processors and associated memory as well as I/O circuits including driver circuitry for generating switching control signals 142 to selectively actuate the switching devices, although separate switching control systems may be employed, for example, with interconnections and information sharing to facilitate the coordinated operation of the rectifier 110a, dynamic braking circuit 110c, and the inverter 110b. The drive 110 also includes a feedback system 118 operatively coupled with the input 112, the rectifier 110a, the DC circuit 150, the inverter 110b, and the output 114. The feedback system 118 includes one or more sensing elements operative to provide one or more feedback signals and/or values 118a indicative of electrical conditions at the input 112, the rectifier 110a, the intermediate DC circuit 150, the inverter 110b, and/or at the output 114. The switch control system 140 may be provided with one or more setpoints or desired values 141 and one or more feedback signals or values 118a from the feedback system 118 by which one or more closed loop motor drive control goals are achieved in normal operation and in dynamic braking operation. The switch control system 140 and the components 144 thereof may be any suitable hardware, processor-executed software, firmware, logic, or combinations thereof that are adapted, configured, programmed, or otherwise operative to implement the functions illustrated and described herein.

Feedback signals or values for the control functions can be based on signals and/or values 118a from the feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). In the illustrated embodiments, the feedback circuit 118 provides one or more feedback signals or values 118a to the controller 140 based on a sensed condition of at least one of the rectifier 110a, the DC circuit 150, and the inverter 110b, including measured motor speed values through appropriate tachometers or other sensor, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

In the illustrated examples, the switch control system 140 includes a mode control component 144m operative to set the switch control system 140 to either a first mode for normal operation of the motor drive 110 or to a second mode for dynamic braking situations, where the exemplary mode control component 144m sets the motor drive mode according to at least one feedback signal or value 118a from the feedback circuit 118. In particular, the illustrated mode control component 144m sets the switch control system 140 to the second mode when a detected or sensed motor speed and a desired motor torque are of opposite polarities or in any other situation in which it is necessary or desirable to slow, stop, or reverse the motor 120 using electrical control techniques via the inverter 110b. The switch control system 140 in these embodiments includes an inverter control component 144b providing the inverter switching control signals 142b in the first and second modes to cause the inverter 110b to selectively convert DC current from the DC circuit 150 to provide AC electrical power to the AC output 114 according to one or more setpoints 141, such as desired motor speed, torque, etc.

In normal operation (first mode), a rectifier control component 144a of the controller 140 provides the rectifier switching control signals 142a to convert AC electrical input power to provide a regulated DC current Idc to the DC circuit 150 according to a desired DC current value Idc* representing the requirements of the inverter 110b. In doing so, the rectifier controller 144a may employ one or more feedback signals or values 118a, such as a measured DC current value from the rectifier 110a representing the actual DC current Idc. In the first mode, the dynamic braking control component 144c provides the dynamic braking switching control signal(s) 142c to prevent current from flowing in the resistance RDB, and thus, the DC current Idc produced and regulated by the rectifier 110a flows unimpeded through the circuit 110c to the DC circuit 150 and from there to the inverter 110b. The DC link current provided by the rectifier 110a thus provides input current for conversion by the inverter 110b, where the exemplary inverter control 144b provides a desired DC link current signal or value Idc* as a setpoint to the rectifier controller 144a. In this manner, the rectifier 110a operates in the first mode to provide the DC current required by the inverter 110b, and the rectifier controller 144a may also implement other control functions such as power factor correction, while the inverter controller 144b performs the necessary motor control operation of the drive 110.

In the second (dynamic braking) mode, the rectifier control component 144a provides the rectifier switching control signals 142a to disconnect the AC input 112 from the DC output to prevent regenerative current from flowing to the AC input 112. In one example, the rectifier controller 144a sets the signals 142a such that all the rectifier switches S1-S6 are off, thereby isolating the AC input source 111 from any regenerative current flow resulting from dynamic braking situations at the motor 120. In another example, one or more pairs of the rectifier switches (e.g., S1/S4, S2/S5, and/or S3/S6 may be turned on to provide a circuit path for regenerative current flow while keeping the AC input 112 disconnected from the DC output of the rectifier 110a. In the dynamic braking mode, moreover, the dynamic braking control component 144c provides the dynamic braking switching control signal(s) 142c to selectively connect the dynamic braking resistance(s) RDB into a circuit formed with the DC circuit 150 to regulate the DC current Idc provided to the inverter 110b according to the desired DC current value Idc* representing the requirements of the inverter 110b. In this manner, the second mode protects generators or other AC input sources 111 from adverse effects of regenerative current while allowing the inverter 110b to control the motor 120 during dynamic braking.

Figure 2:
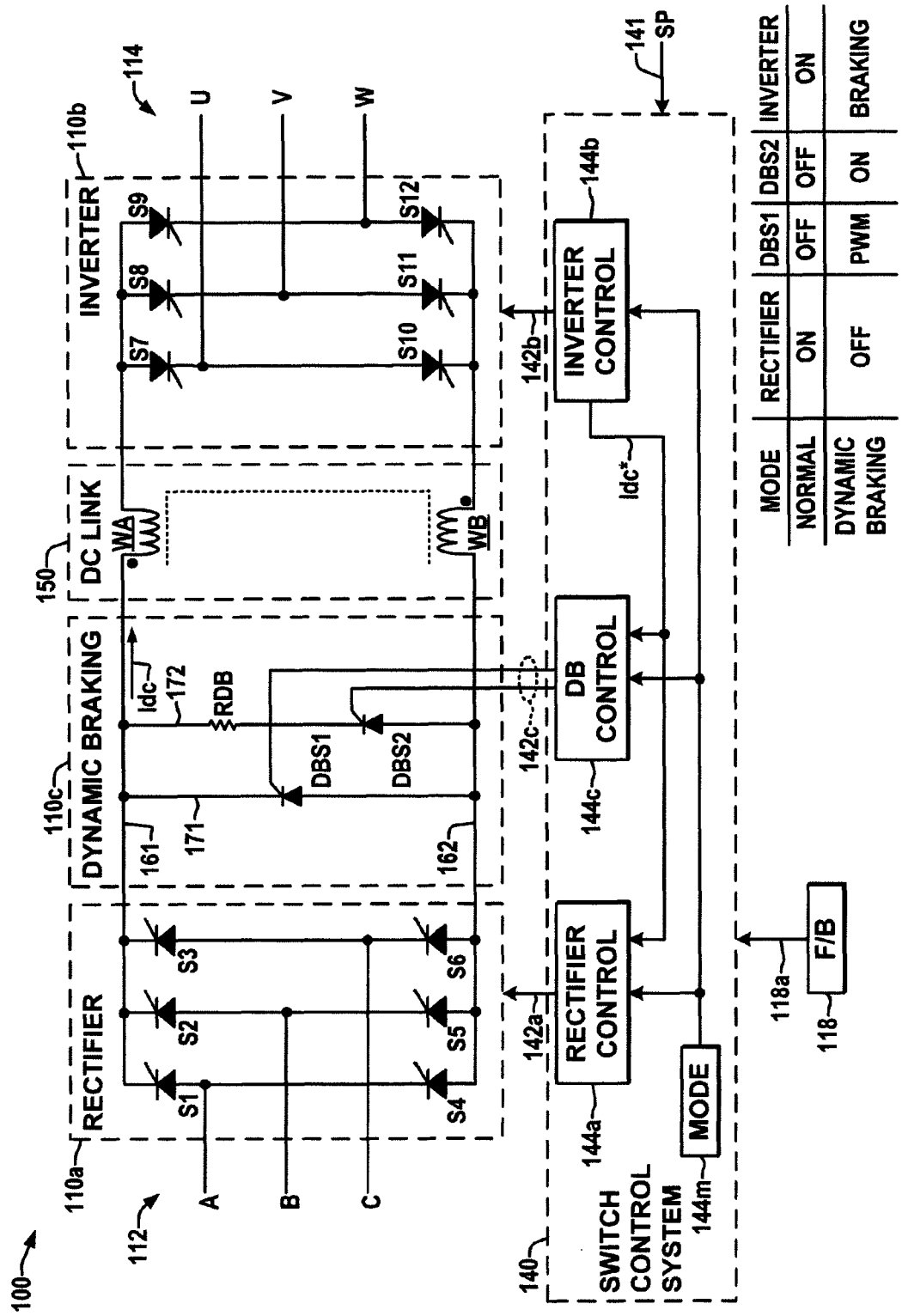
FIG. 2 is a schematic diagram illustrating an embodiment of the motor drive in which the dynamic braking circuit includes a switching device in a first shunt circuit branch across the intermediate circuit input, a second switching device and a braking resistance in a second shunt circuit branch, with the first switch being pulse width modulated to regulate the DC link current in dynamic braking mode.

One embodiment is illustrated in FIG. 2, in which the dynamic braking circuit 110c includes first and second (e.g., upper and lower) series circuit paths 161 and 162 that couple the first and second rectifier DC output nodes to first and second DC current paths of the intermediate DC circuit 150. A first shunt circuit branch 171 extends between the first and second series circuit paths 161 and 162 and includes a first dynamic braking switching device DBS1. A second shunt circuit branch 172 includes a second switching device DBS2 and a dynamic braking resistance RDB coupled in series with one another between the series circuit paths 161 and 162. In the first (normal) mode, the dynamic braking control component 144*c* provides the dynamic braking switching control signals 142*c* to turn the first and second switching devices DBS1 and DBS2 off, thereby allowing free flow of the DC link current Idc for normal motor drive operation controlled by the inverter 110*b* using regulated current provided by the rectifier 110*a*.

In the second mode, the rectifier controller 144*a* stops the active rectification of the rectifier 110*a* to prevent line-side regeneration and the dynamic braking controller 144*c* provides a dynamic braking switching control signal 142*c* to turn the second switching device DBS2 on to establish a circuit for regenerative current flow through the dynamic braking resistance RDB in the braking circuit 110*c*, the DC circuit 150, and the inverter 110*b*. In order to regulate the level of DC link current flow Idc in this series circuit, the dynamic braking controller 144*c* provides a pulse width modulated (PWM) dynamic braking switching control signal 142*c* to alternately turn the first switching device DBS1 on and off according to the desired DC current value Idc* requested by the inverter control component 144*b*. In this regard, the inverter controller 144*b* in one embodiment provides the desired link current setpoint signal or value Idc* to both the rectifier controller 144*a* (for regulation in the first mode) as well as to the dynamic braking controller 144*c* (for regulation in the second mode). Any suitable PWM technique can be used for regulating the link current Idc to the desired value Idc* in the controller 144*c*. The embodiment of FIG. 2 advantageously avoids power dissipation in the dynamic braking circuit 110*c* during normal operation, as the switching devices DBS1 and DBS2 are off in the first mode. In another possible alternative embodiment, the first dynamic braking device DBS1 can be omitted, with the rectifier controller 144*a* turning on one or more pairs of the rectifier switches S1/S4, S2/S5, and/or S3/S6 in the second mode to provide a circuit path for regenerative current flow while blocking regenerative current from flowing to the AC input source 111.

Figure 3:
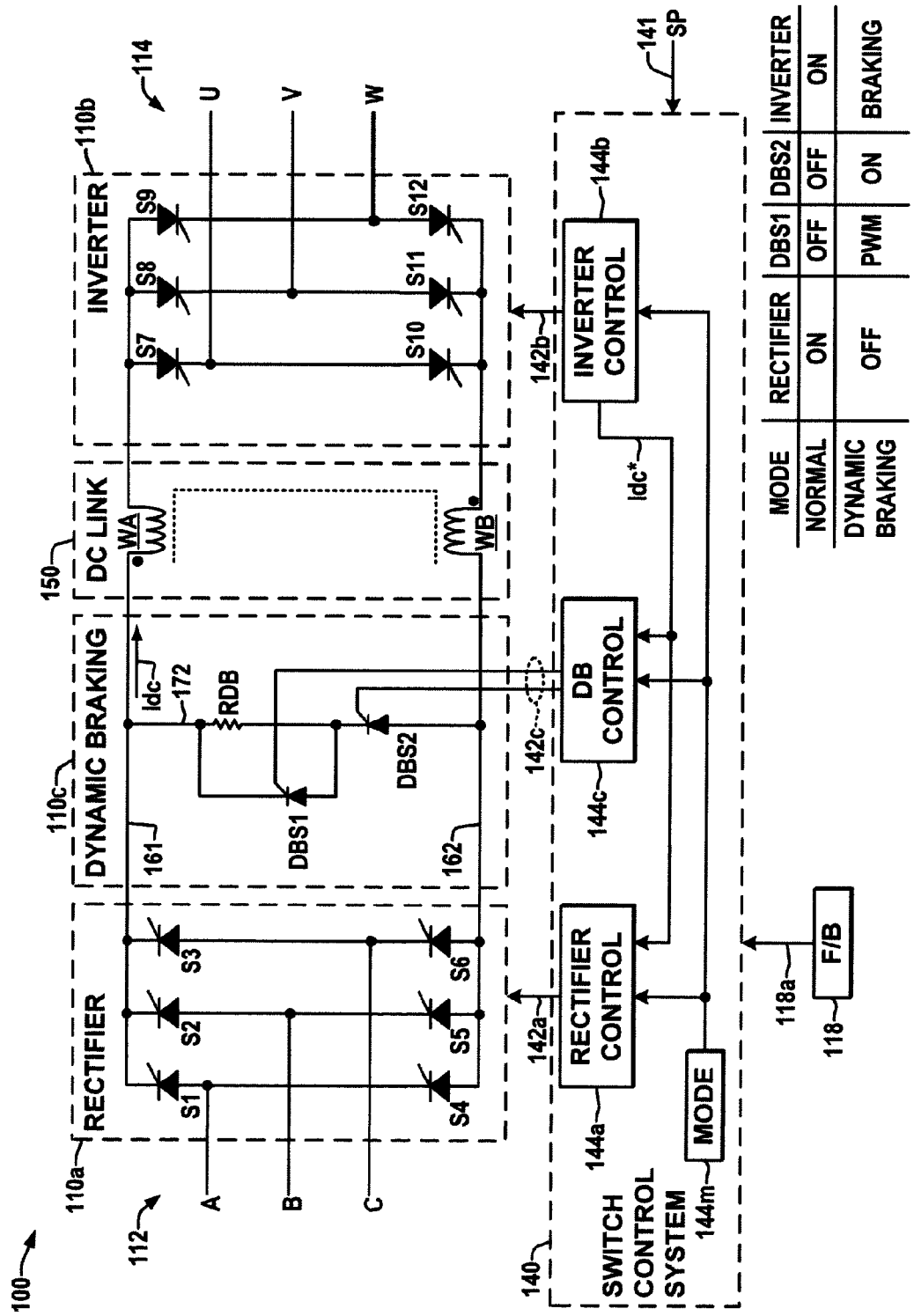
FIG. 3 is a schematic diagram illustrating another embodiment of the motor drive in which the first switching device is connected in parallel across the braking resistance in the shunt circuit branch across the intermediate circuit input.

Another embodiment is shown in FIG. 3, in which the first dynamic braking switching device is connected in parallel across the braking resistance in the shunt circuit branch across the intermediate circuit input. As in the example of FIG. 2, the dynamic braking circuit 110*c* in FIG. 3 includes first and second series circuit paths 161 and 162 coupling the rectifier DC output nodes to the DC current paths of the intermediate circuit 150. A shunt circuit branch 172 extends between the first and second series circuit paths 161 and 162 and includes a first switching device DBS1 coupled in parallel with the resistance RDB and a second switching device DBS2 coupled in series with the parallel combination of the first switching device DBS1 and the resistance RDB. In the first mode, the switching devices DBS1 and DBS2 are held off (non-conductive) as in the embodiment of FIG. 2 above. In the second mode, the braking controller 144*c* provides a signal 142*c* to turn the second switching device DBS2 on and provides a PWM signal 142*c* to alternately turn the first switching device DBS1 on and off to control the DC current Idc according to the desired DC current value Idc* representing the requirements of the inverter 144*b*. In this embodiment, like that of FIG. 2 above, line-side regeneration is completely prevented.

Figure 4:
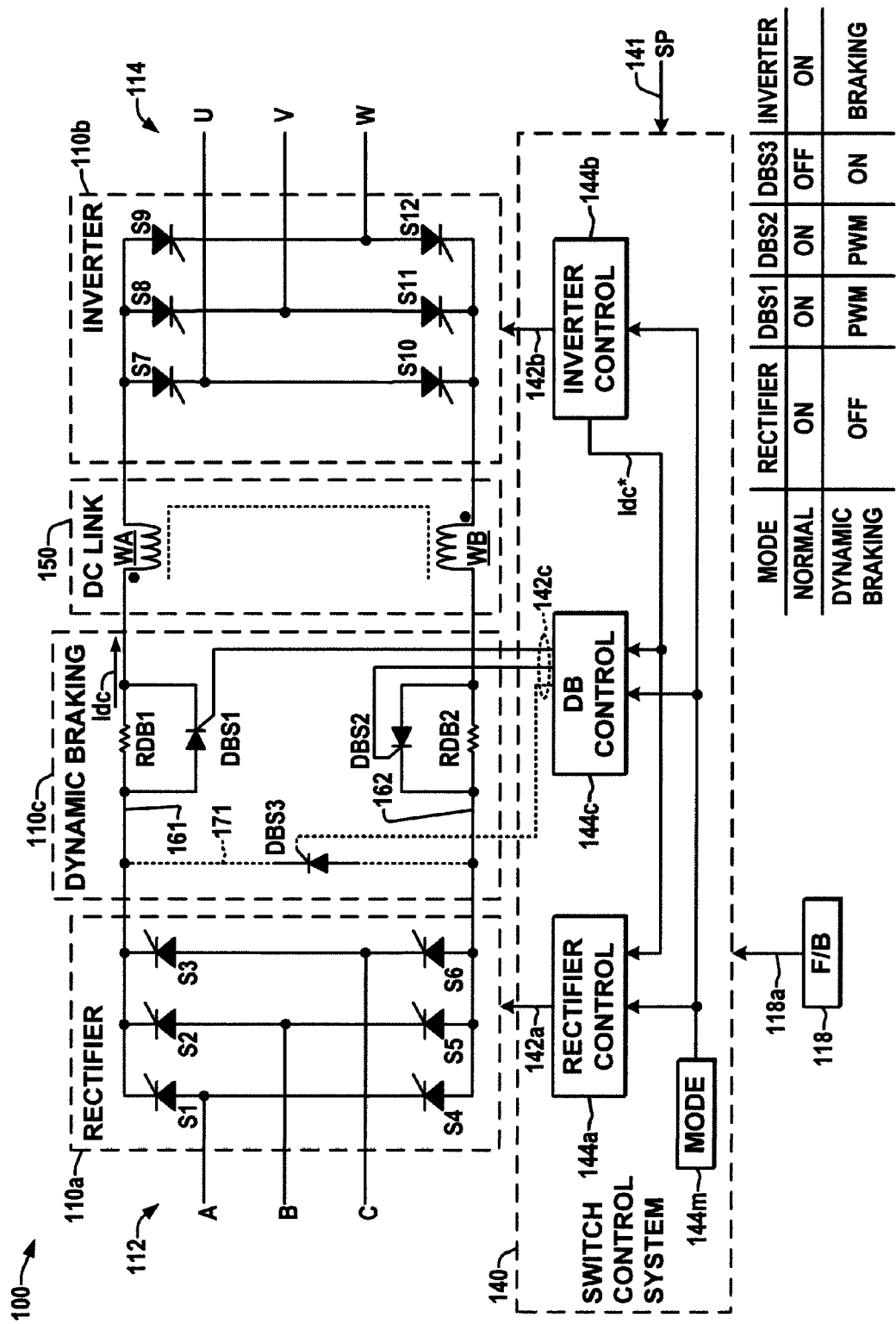
FIG. 4 is a schematic diagram illustrating yet another motor drive embodiment in which upper and lower circuit paths of the dynamic braking circuit individually include parallel connected resistance and switching device circuits.

FIG. 4 shows a further embodiment of the motor drive 110 in which the upper and lower circuit paths 161 and 162 of the dynamic braking circuit 110*c* individually include parallel connected resistance and switching device circuits. In this example, a first switching device DBS1 is coupled in parallel with a first resistance RDB1 in the series circuit path 161, and the second switching device DBS2 is coupled in parallel with the second resistance RDB2 in the second series circuit path 162. In normal operation, the dynamic braking controller 144*c* provides switching control signals 142*c* to turn the first and second switching devices DBS1 and DBS2 on. In dynamic braking mode, the controller 144*c* provides closed loop PWM signals 142*c* to turn the switches DBS1 and DBS2 on and off to control the DC current Idc according to the desired DC current value Idc* requested by the inverter control component 144*b*. In one implementation, a third dynamic braking switching device DBS3 is connected across the rectifier output in a shunt circuit branch 171, and this switch DBS3 is turned off in the first mode, and turned on in the second mode to provide a regenerative current path while the rectifier 110*a* is off. In another possible implementation, DBS3 is omitted and the rectifier controller 144*a* turns one or more of the rectifier switch pairs S1/S4, S2/S5, and/or S3/S6 on in the second mode. The approach of FIG. 4, however, requires that the switches DBS1 and DBS2 remain on during normal motor drive operation, and thus these components must be sized to accommodate the maximum DC current flow levels.

Figure 5:
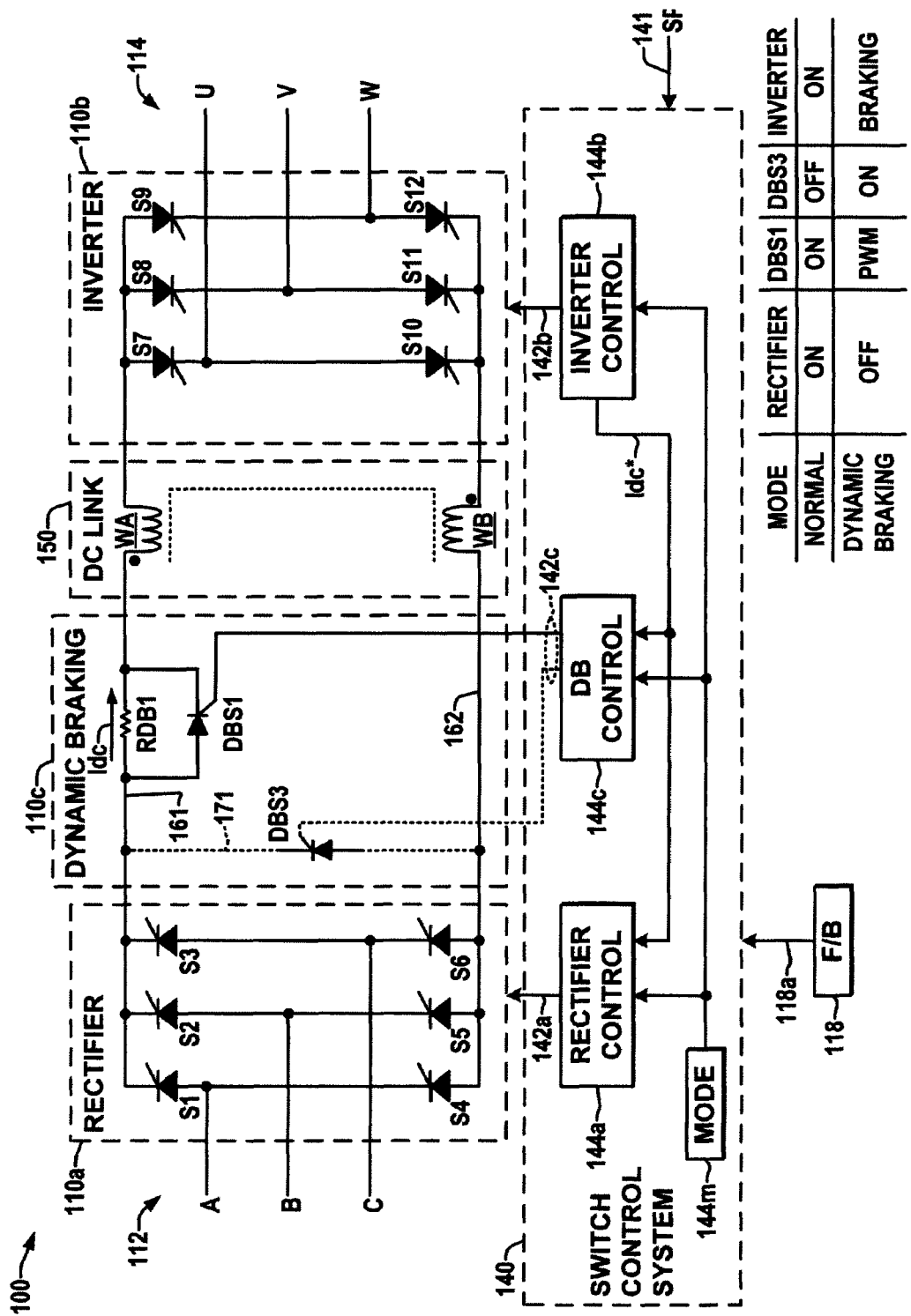
FIG. 5 is a schematic diagram illustrating an embodiment with a resistance and switching device coupled in the upper circuit path of the dynamic braking circuit.

As shown in FIG. 5, another embodiment uses only one set of a dynamic braking resistance and switching device coupled in either the upper circuit path 161 or the lower path 162 of the dynamic braking circuit. In this example, a first resistance RDB1 and a first switching device DBS1 are coupled in parallel in one of the first and second series circuit paths 161 or 162, and the dynamic braking control component 144*c* turns the switching device DBS1 on in the first mode. In the second mode, the switching device DBS1 is pulse width modulated by the controller 144*c* to regulate the DC link current Idc according to the desired DC current value Idc* provided by the inverter control component 144*b*. In one possible embodiment, a third switching device DBS3 is coupled between the series circuit paths 161 and 162 (off during first mode, on during dynamic braking mode), and alternatively one or more of the rectifier switch pairs S1/S4, S2/S5, and/or S3/S6 can be turned on by the rectifier controller 144*a* in the second mode to establish a path for regenerative current while preventing such current from flowing into the source 111.

With continued reference to FIGS. 4 and 5, another control option can be implemented in which DBS1 and DBS2 (if available) are turned off, and where DBS3 is not required, with the rectifier/inverter 110*a* operation managing the regenerative power flow between the resistance(s) RDB and the line side. This operational mode is useful if some regenerative power flow to the line side is allowed. In such embodiments, the rectifier 110*a* controls the DC link current Idc similar to the normal operating mode, but since DBS1 and DBS2 remain off during dynamic braking, the DC link current flows through the RDBs to dissipate power. Moreover, depending on the polarity and magnitude of average rectifier side dc link voltage and the magnitude of the dc link current Idc, the line side power flow can be controlled as well.

Figure 6:
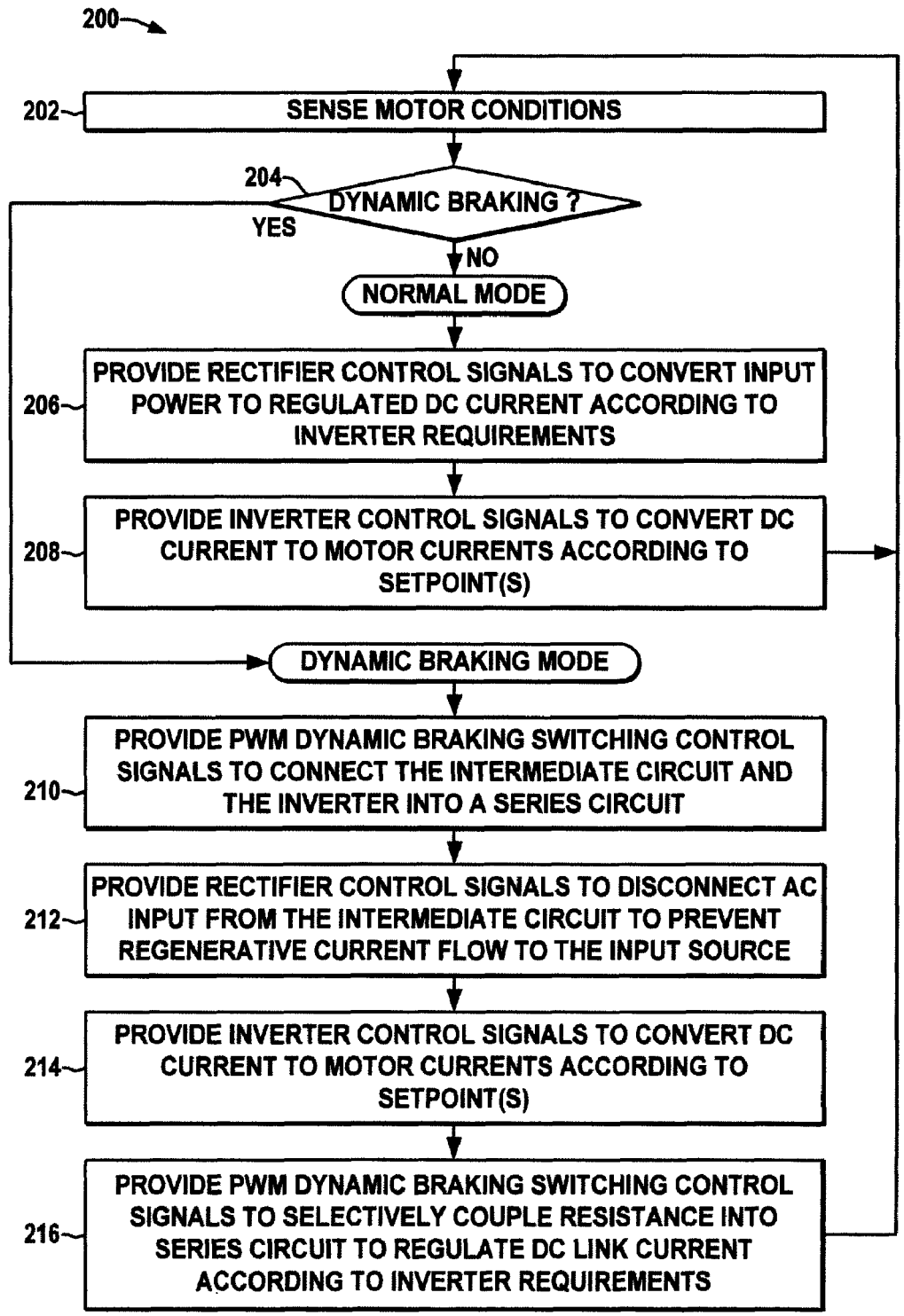
FIG. 6 is a flow diagram illustrating an exemplary method for operating a CSC motor drive in accordance with further aspects of the disclosure.

FIG. 6 is a flow diagram illustrating an exemplary method 200 for operating a CSC motor drive in accordance with further aspects of the disclosure. While the method 200 is illustrated and described below in the form of a series of acts or events, it will be appreciated that the various methods of the disclosure are not limited by the illustrated ordering of such acts or events, and that except as specifically provided hereinafter, some acts or events may occur in different order and/or concurrently with other acts or events apart from those illustrated and described herein. In addition, not all illustrated steps may be required to implement a process or method in accordance with the present disclosure, and one or more such acts may be combined. The illustrated methods may be implemented in hardware, processor-executed software, programmable logic, etc., or combinations thereof, in order to provide the motor drive control and dynamic braking functionality described herein, and may be employed in any current source converter-based motor drive such as in the switching control system 140 of the exemplary drives 110 shown and described above, wherein the disclosure is not limited to the specifically illustrated and described applications and embodiments.

The process 200 begins at 202 with the feedback system 118 and the controller 140 sensing and/or otherwise determining the conditions of one or more of the rectifier 110a, the intermediate DC circuit 150 and the inverter 110b. A determination is made at 204 as to whether the sensed motor condition(s) indicates a dynamic braking condition, for example, when a detected or sensed motor speed and a desired motor torque are of opposite polarities. If so (YES at 204), the process proceeds to 210-216 as described below. If the motor conditions do not indicate a dynamic braking situation (NO at 204), the controller 140 proceeds in a first (normal) operational mode with the rectifier controller 144a providing rectifier switching control signals 142a to the active rectifier 110a at 206 to convert AC electrical input power to provide a DC current Idc to the intermediate and to regulate the current Idc according to a desired DC current value Idc* representing the requirements of the inverter 110b. At 208, the inverter control component 144b provides inverter switching control signals 142b to the inverter 110b to convert the regulated DC current to provide AC electrical power to the AC output 114 according to at least one setpoint 141, after which the process returns to 202, 204 to continue monitoring the motor condition(s) for detecting dynamic braking conditions.

Once a dynamic braking condition is determined (YES at 204), the process continues to a second operational mode (dynamic braking mode) at 210 with the dynamic braking controller 144c providing signals 142c at 210 to connect the intermediate DC circuit 150 and the inverter 110b into a series circuit. At 212, the rectifier controller 144a provides the rectifier switching control signals 142a so as to disconnect the AC input 112 from the DC circuit to prevent regenerative current from flowing to the AC input 112, and the inverter controller 144b continues at 214 to provide the inverter switching control signals 142b convert DC current from the series circuit 150 to provide AC electrical power to the AC output 114 according to the setpoint(s) 141. At 216, the dynamic braking controller 144c provides signals 142c to selectively connect one or more resistances RDB in the series circuit to regulate the DC current Idc provided to the inverter 110b according to the desired DC current value Idc* representing the inverter requirements. The process 200 then returns to 202, 204 to again assess the motor condition(s) for detecting dynamic braking conditions.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A current source converter motor drive, comprising:
an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;
a DC circuit comprising a DC link inductor with first and second windings coupled in corresponding first and second DC current paths;
a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;
an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal;
a switch control system selectively operable in a first mode for normal motor drive operation and in a second mode for dynamic braking operation, the switch control system comprising:
an inverter control component operative to provide the inverter switching control signals in the first and second modes to cause the inverter to selectively convert DC current from the DC circuit to provide AC electrical power to the AC output according to at least one setpoint,
a rectifier control component operative to provide the rectifier switching control signals in the first mode to convert AC electrical input power to provide a regulated DC current to the DC circuit according to a desired DC current value representing the requirements of the inverter and in the second mode to disconnect the AC input from the DC output to prevent regenerative current from flowing to the AC input, and
a dynamic braking control component operative to provide at least one dynamic braking switching control signal in the first mode to prevent current from flowing in the at least one resistance and in the second mode to selectively connect the at least one resistance into a circuit formed with the DC circuit to regulate the DC current provided to the inverter according to the desired DC current value; and a feedback circuit providing at least one feedback signal or value based on a sensed condition of at least one of the rectifier, the DC circuit, and the inverter, wherein the switch control system further comprises a mode control component operative to set the switch control system to either the first or second mode according to at least one feedback signal or value from the feedback circuit.

2. The motor drive of claim 1, wherein the mode control component is operative to set the switch control system to the second mode when a detected or sensed motor speed and a desired motor torque are of opposite polarities.

3. The motor drive of claim 1, wherein the dynamic braking circuit comprises a first series circuit path coupling the first rectifier DC output node to the first DC current path of the DC circuit, a second series circuit path coupling the second rectifier DC output node to the second DC current path of the DC circuit, a first shunt circuit branch including a first switching device coupled between the first and second series circuit paths, and a second shunt circuit branch including a second switching device and the resistance coupled in series with one another between the between the first and second series circuit paths; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value requested by the inverter control component.

4. The motor drive of claim 1, wherein the dynamic braking circuit comprises a first series circuit path coupling the first rectifier DC output node to the first DC current path of the DC circuit, a second series circuit path coupling the second rectifier DC output node to the second DC current path of the DC circuit, a shunt circuit branch between the first and second series circuit paths, the shunt circuit branch including a first switching device coupled in parallel with the resistance and a second switching device coupled in series with the parallel combination of the first switching device and the resistance; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value representing the requirements of the inverter.

5. The motor drive of claim 1, wherein the dynamic braking circuit comprises a first series circuit path coupling the first rectifier DC output node to the first DC current path of the DC circuit, a second series circuit path coupling the second rectifier DC output node to the second DC current path of the DC circuit, first and second resistances, and first and second switching devices, the first switching device being coupled in parallel with the first resistance in the first series circuit path, and the second switching device being coupled in parallel with the second resistance in the second series circuit path; and wherein the dynamic braking control component is operative in the first mode to provide a dynamic braking switching control signal to turn the first and second switching devices on, and in the second mode to provide pulse width modulated dynamic braking switching control signals to turn the first and second switching devices on and off to control the DC current provided to the inverter according to the desired DC current value representing the requirements of the inverter.

6. The motor drive of claim 5, wherein the dynamic braking circuit further comprises a shunt circuit branch including a third switching device coupled between the first and second series circuit paths; and wherein the dynamic braking control component is operative in the first mode to provide a dynamic braking switching control signal to turn the third switching device off, and in the second mode to provide a dynamic braking switching control signal to turn the third switching device on.

7. The motor drive of claim 1, wherein the dynamic braking circuit comprises a first series circuit path coupling the first rectifier DC output node to the first DC current path of the DC circuit, a second series circuit path coupling the second rectifier DC output node to the second DC current path of the DC circuit, a first resistance and a first switching device coupled in parallel with the resistance in one of the first and second series circuit paths; and wherein the dynamic braking control component is operative in the first mode to provide a dynamic braking switching control signal to turn the first switching device on, and in the second mode to provide a pulse width modulated dynamic braking switching control signal to alternately turn the first switching device on and off to control the DC current provided to the inverter according to the desired DC current value representing the requirements of the inverter.

8. The motor drive of claim 7, wherein the dynamic braking circuit further comprises a shunt circuit branch including a third switching device coupled between the first and second series circuit paths; and wherein the dynamic braking control component is operative in the first mode to provide a dynamic braking switching control signal to turn the third switching device off, and in the second mode to provide a dynamic braking switching control signal to turn the third switching device on.

9. A current source converter motor drive, comprising:

an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;

a DC circuit comprising a DC link inductor with first and second windings coupled in corresponding first and second DC current paths;

a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;

an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal; and a switch control system selectively operable in a first mode for normal motor drive operation and in a second mode for dynamic braking operation, the switch control system comprising:
- an inverter control component operative to provide the inverter switching control signals in the first and second modes to cause the inverter to selectively convert DC current from the DC circuit to provide AC electrical power to the AC output according to at least one setpoint,
- a rectifier control component operative to provide the rectifier switching control signals in the first mode to convert AC electrical input power to provide a regulated DC current to the DC circuit according to a desired DC current value representing the requirements of the inverter and in the second mode to disconnect the AC input from the DC output to prevent regenerative current from flowing to the AC input, and
- a dynamic braking control component operative to provide at least one dynamic braking switching control signal in the first mode to prevent current from flowing in the at least one resistance and in the second mode to selectively connect the at least one resistance into a circuit formed with the DC circuit to regulate the DC current provided to the inverter according to the desired DC current value;

wherein the dynamic braking circuit comprises a first series circuit path coupling the first rectifier DC output node to the first DC current path of the DC circuit, a second series circuit path coupling the second rectifier DC output node to the second DC current path of the DC circuit, a first shunt circuit branch including a first switching device coupled between the first and second series circuit paths, and a second shunt circuit branch including a second switching device and the resistance coupled in series with one another between the between the first and second series circuit paths; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value representing the requirements of the inverter.

10. A current source converter motor drive, comprising:

an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;

a DC circuit comprising a DC link inductor with first and second windings coupled in corresponding first and second DC current paths;

a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;

an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal; and a switch control system selectively operable in a first mode for normal motor drive operation and in a second mode for dynamic braking operation, the switch control system comprising:
- an inverter control component operative to provide the inverter switching control signals in the first and second modes to cause the inverter to selectively convert DC current from the DC circuit to provide AC electrical power to the AC output according to at least one setpoint,
- a rectifier control component operative to provide the rectifier switching control signals in the first mode to convert AC electrical input power to provide a regulated DC current to the DC circuit according to a desired DC current value representing the requirements of the inverter and in the second mode to disconnect the AC input from the DC output to prevent regenerative current from flowing to the AC input, and
- a dynamic braking control component operative to provide at least one dynamic braking switching control signal in the first mode to prevent current from flowing in the at least one resistance and in the second mode to selectively connect the at least one resistance into a circuit formed with the DC circuit to regulate the DC current provided to the inverter according to the desired DC current value;

wherein the dynamic braking circuit comprises a first series circuit path coupling the first rectifier DC output node to the first DC current path of the DC circuit, a second series circuit path coupling the second rectifier DC output node to the second DC current path of the DC circuit, a shunt circuit branch between the first and second series circuit paths, the shunt circuit branch including a first switching device coupled in parallel with the resistance and a second switching device coupled in series with the parallel combination of the first switching device and the resistance; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value representing the requirements of the inverter.

11. A current source converter motor drive, comprising:
an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;
a DC circuit comprising a DC link inductor with first and second windings coupled in corresponding first and second DC current paths;
a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;
an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal; and
a switch control system selectively operable in a first mode for normal motor drive operation and in a second mode for dynamic braking operation, the switch control system comprising:
an inverter control component operative to provide the inverter switching control signals in the first and second modes to cause the inverter to selectively convert DC current from the DC circuit to provide AC electrical power to the AC output according to at least one setpoint,
a rectifier control component operative to provide the rectifier switching control signals in the first mode to convert AC electrical input power to provide a regulated DC current to the DC circuit according to a desired DC current value representing the requirements of the inverter and in the second mode to disconnect the AC input from the DC output to prevent regenerative current from flowing to the AC input, and
a dynamic braking control component operative to provide at least one dynamic braking switching control signal in the first mode to prevent current from flowing in the at least one resistance and in the second mode to selectively connect the at least one resistance into a circuit formed with the DC circuit to regulate the DC current provided to the inverter according to the desired DC current value;
wherein the dynamic braking circuit comprises a first series circuit path coupling the first rectifier DC output node to the first DC current path of the DC circuit, a second series circuit path coupling the second rectifier DC output node to the second DC current path of the DC circuit, first and second resistances, and first and second switching devices, the first switching device being coupled in parallel with the first resistance in the first series circuit path, and the second switching device being coupled in parallel with the second resistance in the second series circuit path; and
wherein the dynamic braking control component is operative in the first mode to provide dynamic braking switching control signals to turn the first and second switching devices on, and in the second mode to provide pulse width modulated dynamic braking switching control signals to turn the first send second switching devices on and off to control the DC current provided to the inverter according to the desired DC current value representing the requirements of the inverter.

12. The motor drive of claim 11, wherein the dynamic braking circuit further comprises a shunt circuit branch including a third switching device coupled between the first and second series circuit paths; and wherein the dynamic braking control component is operative in the first mode to provide a dynamic braking switching control signal to turn the third switching device off, and in the second mode to provide a dynamic braking switching control signal to turn the third switching device on.

13. A current source converter motor drive, comprising:
an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;
a DC circuit comprising a DC link inductor with first and second windings coupled in corresponding first and second DC current paths;
a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;
an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal; and
a switch control system selectively operable in a first mode for normal motor drive operation and in a second mode for dynamic braking operation, the switch control system comprising:
an inverter control component operative to provide the inverter switching control signals in the first and second modes to cause the inverter to selectively convert DC current from the DC circuit to provide AC electrical power to the AC output according to at least one setpoint,
a rectifier control component operative to provide the rectifier switching control signals in the first mode to convert AC electrical input power to provide a regulated DC current to the DC circuit according to a desired DC current value representing the requirements of the inverter and in the second mode to disconnect the AC input from the DC output to prevent regenerative current from flowing to the AC input, and
a dynamic braking control component operative to provide at least one dynamic braking switching control signal in the first mode to prevent current from flowing in the at least one resistance and in the second mode to selectively connect the at least one resistance into a circuit formed with the DC circuit to regulate the DC current provided to the inverter according to the desired DC current value;
wherein the dynamic braking circuit comprises a first series circuit path coupling the first rectifier DC output node to the first DC current path of the DC circuit, a second series circuit path coupling the second rectifier DC output node to the second DC current path of the DC circuit, a first resistance and a first switching device coupled in parallel with the resistance in one of the first and second series circuit paths; and
wherein the dynamic braking control component is operative in the first mode to provide a dynamic braking switching control signal to turn the first switching device on, and in the second mode to provide a pulse width modulated dynamic braking switching control signal to alternately turn the first switching device on and off to control the DC current provided to the inverter according to the desired DC current value representing the requirements of the inverter.

14. The motor drive of claim 13, wherein the dynamic braking circuit further comprises a shunt circuit branch including a third switching device coupled between the first and second series circuit paths; and wherein the dynamic braking control component is operative in the first mode to provide a dynamic braking switching control signal to turn the third switching device off, and in the second mode to provide a dynamic braking switching control signal to turn the third switching device on.

15. A method for operating a current source converter motor drive, the method comprising:
in a first operational mode of the motor drive:
providing rectifier switching control signals to an active rectifier to convert AC electrical input power to provide a DC current to an intermediate DC circuit having a DC link inductor;
regulating the DC current provided to the intermediate DC circuit according to a desired DC current value representing the requirements of the inverter; and
providing inverter switching control signals to the inverter to convert DC current from the intermediate DC circuit to provide AC electrical power to the AC output according to at least one setpoint; and
in a second operational mode of the motor drive:
connecting the intermediate DC circuit and the inverter into a series circuit;
providing rectifier switching control signals to disconnect the AC input from the DC circuit to prevent regenerative current from flowing to the AC input;
providing the inverter switching control signals to the inverter to convert DC current from the intermediate DC circuit to provide AC electrical power to the AC output according to the at least one setpoint; and
providing dynamic braking switching control signals to selectively connect at least one resistance in the series circuit to regulate the DC current provided to the inverter according to the desired DC current value representing the requirements of the inverter;
wherein providing dynamic braking switching control signals in the second operational mode comprises providing a pulse width modulated dynamic braking switching control signal to a switching device of the series circuit to selectively couple at least one resistance into the series circuit to regulate the DC current provided to the inverter according to the desired DC current value.

16. The method of claim 15, further comprising:
sensing a condition of at least one of the rectifier, the intermediate DC circuit, and the inverter; and
setting the operational mode of the motor drive to either the first or second mode according the sensed condition.

17. A method for operating a current source converter motor drive, the method comprising:
in a first operational mode of the motor drive:
providing rectifier switching control signals to an active rectifier to convert AC electrical input power to provide a DC current to an intermediate DC circuit having a DC link inductor,
regulating the DC current provided to the intermediate DC circuit according to a desired DC current value representing the requirements of the inverter, and
providing inverter switching control signals to the inverter to convert DC current from the intermediate DC circuit to provide AC electrical power to the AC output according to at least one setpoint; and
in a second operational mode of the motor drive:
connecting the intermediate DC circuit and the inverter into a series circuit;
providing rectifier switching control signals to disconnect the AC input from the DC circuit to prevent regenerative current from flowing to the AC input,
providing the inverter switching control signals to the inverter to convert DC current from the intermediate DC circuit to provide AC electrical power to the AC output according to the at least one setpoint, and
providing dynamic braking switching control signals to selectively connect at least one resistance in the series circuit to regulate the DC current provided to the inverter according to the desired DC current value representing the requirements of the inverter;
sensing a condition of at least one of the rectifier, the intermediate DC circuit, and the inverter; and
setting the operational mode of the motor drive to either the first or second mode according the sensed condition.

18. The method of claim 17, comprising setting the operational mode of the motor drive to the second mode when a detected or sensed motor speed and a desired motor torque are of opposite polarities.

19. A current source converter motor drive, comprising:
an active rectifier comprising an AC input having a plurality of AC input nodes to receive AC electrical input power, a DC output having first and second DC output nodes, and a rectifier switching network comprising a plurality of rectifier switching devices individually coupled between one of the AC input nodes and one of the first and second DC output nodes, the rectifier switching devices individually operable to selectively couple the AC input node with the corresponding DC output node according to a corresponding rectifier switching control signal;

a DC circuit comprising a DC link inductor with first and second windings coupled in corresponding first and second DC current paths;

a dynamic braking circuit operatively coupled between the DC output nodes and the first and second DC current paths, the dynamic braking circuit comprising at least one resistance and at least one switching device, operable to selectively connect the resistance into a circuit formed with the DC circuit according to a corresponding dynamic braking switching control signal;

an inverter comprising an AC output having a plurality of AC output nodes for supplying AC electrical power to a motor load, and an inverter switching network comprising a plurality of inverter switching devices individually coupled between one of the DC current paths and one of the AC output nodes, the inverter switching devices individually operable to selectively electrically couple the corresponding DC current path with the corresponding AC output node according to a corresponding inverter switching control signal; and a switch control system selectively operable in a first mode for normal motor drive operation and in a second mode for dynamic braking operation, the switch control system comprising:

an inverter control component operative to provide the inverter switching control signals in the first and second modes to cause the inverter to selectively convert DC current from the DC circuit to provide AC electrical power to the AC output according to at least one setpoint, a rectifier control component operative to provide the rectifier switching control signals in the first and second modes to convert AC electrical input power to provide a regulated DC current to the DC circuit according to a desired DC current value representing the requirements of the inverter, and a dynamic braking control component operative to provide at least one dynamic braking switching control signal in the first mode to prevent current from flowing in the at least one resistance and in the second mode to connect the at least one resistance into a circuit formed with the DC circuit;

wherein the first winding of the DC link inductor is coupled in the first DC current path between the first DC output node of the active rectifier and the inverter, and wherein the second winding of the DC link inductor is coupled in the second DC current path between the second DC output node of the active rectifier and the inverter.

20. The motor drive of claim 19, a feedback circuit providing at least one feedback signal or value based on a sensed condition of at least one of the rectifier, the DC circuit, and the inverter, wherein the switch control system further comprises a mode control component operative to set the switch control system to either the first or second mode according to at least one feedback signal or value from the feedback circuit.

21. The motor drive of claim 20, wherein the mode control component is operative to set the switch control system to the second mode when a detected or sensed motor speed and a desired motor torque are of opposite polarities.

22. The motor drive of claim 19, wherein the dynamic braking circuit comprises a first series circuit path coupling the first rectifier DC output node to the first DC current path of the DC circuit, a second series circuit path coupling the second rectifier DC output node to the second DC current path of the DC circuit, a first shunt circuit branch including a first switching device coupled between the first and second series circuit paths, and a second shunt circuit branch including a second switching device and the resistance coupled in series with one another between the between the first and second series circuit paths; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value requested by the inverter control component.

23. The motor drive of claim 19, wherein the dynamic braking circuit comprises a first series circuit path coupling the first rectifier DC output node to the first DC current path of the DC circuit, a second series circuit path coupling the second rectifier DC output node to the second DC current path of the DC circuit, a shunt circuit branch between the first and second series circuit paths, the shunt circuit branch including a first switching device coupled in parallel with the resistance and a second switching device coupled in series with the parallel combination of the first switching device and the resistance; and wherein the dynamic braking control component is operative in the first mode to provide dynamic braking switching control signals to turn the first and second switching devices, off, and in the second mode to provide a dynamic braking switching control signal to turn the second switching device on and to provide a pulse width modulated dynamic braking switching control signal to alternately turn the first switching device on and off to control the DC current provided to the inverter according to the desired DC current value representing the requirements of the inverter.

24. The motor drive of claim 19, wherein the dynamic braking circuit comprises a first series circuit path coupling the first rectifier DC output node to the first DC current path of the DC circuit, a second series circuit path coupling the second rectifier DC output node to the second DC current path of the DC circuit, first and second resistances, and first and second switching devices, the first switching device being coupled in parallel with the first resistance in the first series circuit path, and the second switching device being coupled in parallel with the second resistance in the second series circuit path; and wherein the dynamic braking control component is operative in the first mode to provide a dynamic braking switching control signal to turn the first and second switching devices on, and in the second mode to provide pulse width modulated dynamic braking switching control signals to turn the first and second switching devices on and off to control the DC current provided to the inverter according to the desired DC current value representing the requirements of the inverter.

25. The motor drive of claim 19, wherein the dynamic braking circuit comprises a first series circuit path coupling the first rectifier DC output node to the first DC current path of the DC circuit, a second series circuit path coupling the second rectifier DC output node to the second DC current path of the DC circuit, a first resistance and a first switching device coupled in parallel with the resistance in one of the first and second series circuit paths; and wherein the dynamic braking control component is operative in the first mode to provide a dynamic braking switching control signal to turn the first switching device on, and in the second mode to provide a pulse width modulated dynamic braking switching control signal to alternately turn the first switching device on and off to control the DC current provided to the inverter according to the desired DC current value representing the requirements of the inverter.

* * * * *